United States Patent
Lakkis

(10) Patent No.: US 8,681,841 B2
(45) Date of Patent: Mar. 25, 2014

(54) METHOD AND APPARATUS FOR A SINGLE-CARRIER WIRELESS COMMUNICATION SYSTEM

(75) Inventor: Ismail Lakkis, San Diego, CA (US)

(73) Assignee: Adeptence, LLC, San Diego, CA (US)

( * ) Notice: Subject to any disclaimer, the term of this patent is extended or adjusted under 35 U.S.C. 154(b) by 601 days.

(21) Appl. No.: 12/911,735

(22) Filed: Oct. 26, 2010

(65) Prior Publication Data

US 2011/0110457 A1    May 12, 2011

Related U.S. Application Data

(60) Provisional application No. 61/259,623, filed on Nov. 9, 2009.

(51) Int. Cl.
*H04B 1/38* (2006.01)
*H04K 1/10* (2006.01)
*H04J 1/00* (2006.01)

(52) U.S. Cl.
USPC ............................. 375/222; 375/260; 370/480

(58) Field of Classification Search
USPC ................................. 375/260, 222; 370/480
See application file for complete search history.

(56) References Cited

U.S. PATENT DOCUMENTS

| | | | | |
|---|---|---|---|---|
| 7,088,782 | B2 * | 8/2006 | Mody et al. | 375/260 |
| 7,697,619 | B2 * | 4/2010 | Chow et al. | 375/260 |
| 2002/0181509 | A1 * | 12/2002 | Mody et al. | 370/480 |
| 2003/0026263 | A1 * | 2/2003 | Taunton | 370/395.1 |
| 2003/0026331 | A1 * | 2/2003 | Taunton | 375/222 |
| 2006/0062317 | A1 * | 3/2006 | Chang et al. | 375/260 |
| 2006/0079178 | A1 * | 4/2006 | Palin et al. | 455/41.2 |
| 2006/0087960 | A1 * | 4/2006 | Kim et al. | 370/203 |
| 2007/0036234 | A1 * | 2/2007 | Chen et al. | 375/260 |
| 2008/0019314 | A1 * | 1/2008 | Gorokhov et al. | 370/330 |
| 2009/0028258 | A1 * | 1/2009 | Ma et al. | 375/260 |

\* cited by examiner

*Primary Examiner* — Leon-Viet Nguyen
*Assistant Examiner* — Sarah Hassan
(74) *Attorney, Agent, or Firm* — Steven J Shattil

(57) ABSTRACT

A method of communication comprises partitioning a single-carrier data stream into equal-size blocks, and partitioning each block into a plurality of equal-size sub-blocks. A first set of cyclic prefixes and/or postfixes is inserted into the blocks to allow a linear convolution of a frequency-selective multipath channel having a long delay spread to be modeled as a circular convolution at a receiver. A second set of cyclic prefixes and/or postfixes is inserted into the sub-blocks to allow a linear convolution of a frequency-selective multipath channel having a short delay spread to be modeled as a circular convolution at the receiver. Upon receiving a transmitted data frame from the multipath channel, the receiver measures a link quality index (LQI) of a short channel impulse response; and selects block-by-block equalization or sub-block by sub-block equalization based on the LQI.

17 Claims, 10 Drawing Sheets

FIG. 5A

Data 510, block 500:
- 520-1: BLOCK #1, LENGTH: $K=2^L$
- 520-(A-1): BLOCK #A-1, LENGTH: $K=2^L$
- 520-A: BLOCK #A, LENGTH: $K=2^L$
- 520-(A+1): BLOCK #A+1, LENGTH: $K=2^L$
- 520-1: BLOCK #2, LENGTH: $K=2^L$
- 530: $C_M$, $M=2^N$

FIG. 5B

Block of length $K=2^L$ (552), block 550:
- 554-1: SUB-BLOCK #1, 556: $C_M$
- 554-2: SUB-BLOCK #2, 558-1: $D_{1,M,R}$, 560-1: $C_R$
- 554-3: SUB-BLOCK #3, 558-2: $D_{2,M,R}$, 560-2: $C_R$
- 554-J: SUB-BLOCK #J, 558-(J-1): $D_{K,J-1,R}$, 560-(J-1): $C_R$

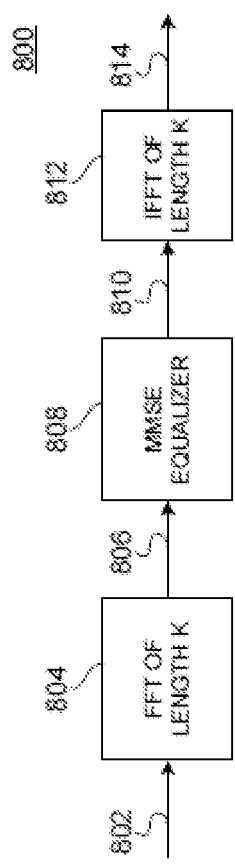
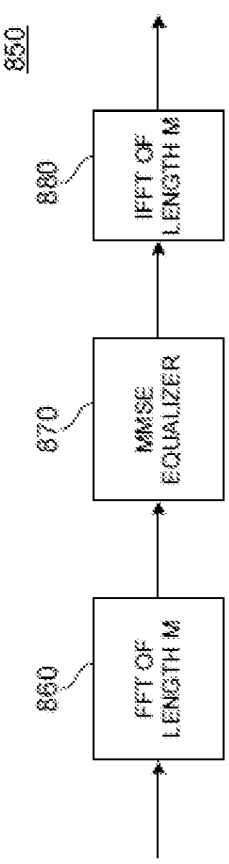
FIG. 8A
FIG. 8B

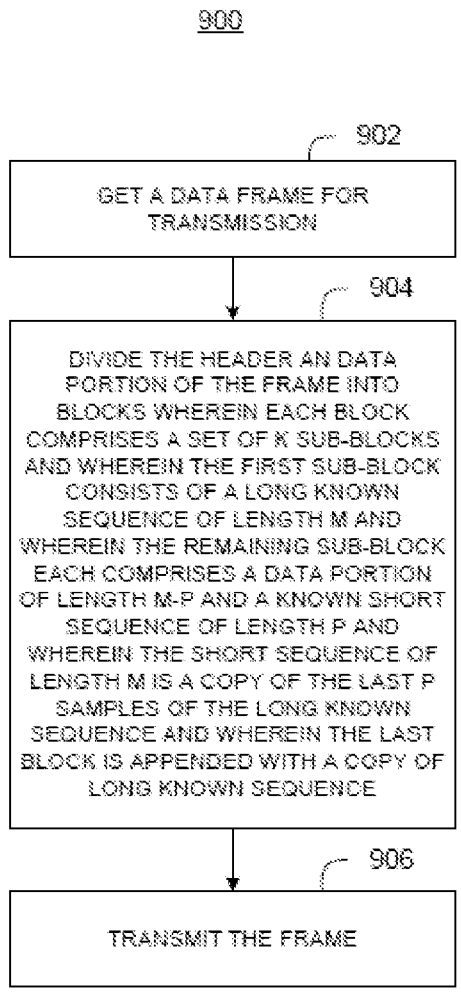
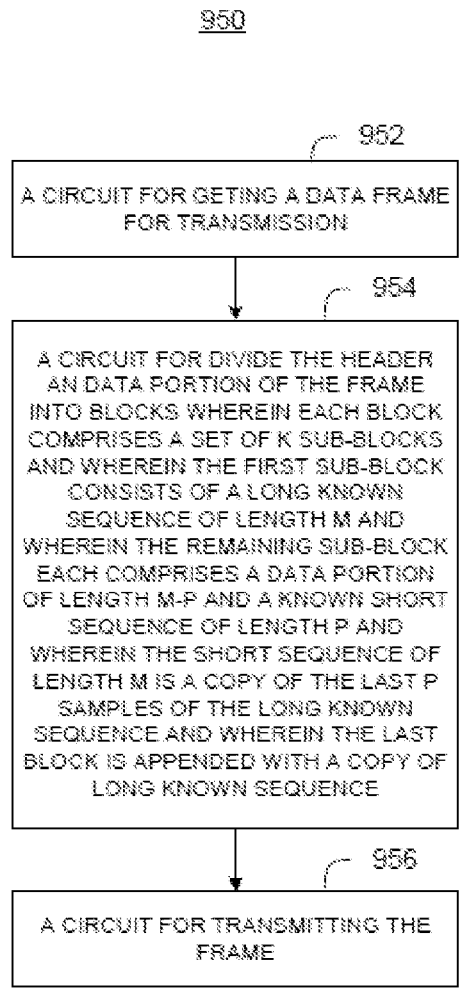
FIG. 9A
FIG. 9B

METHOD AND APPARATUS FOR A SINGLE-CARRIER WIRELESS COMMUNICATION SYSTEM

CROSS-REFERENCE TO RELATED APPLICATIONS

This application claims priority under 35 U.S.C. 119(e) to U.S. Provisional Application Ser. No. 61/259,623, filed Nov. 9, 2009.

FIELD

Certain aspects of the present disclosure generally relate to wireless communications, and more particularly, to a single-carrier wireless communication system wherein depending on the wireless channel condition, the data may be equalized using a low-complexity equalizer or a higher-complexity equalizer.

BACKGROUND

In one aspect of the related art, a wireless communication system comprises a set of devices supporting at least one of a single-carrier (SC) physical (PHY) layer and an Orthogonal Frequency Division Multiplexing (OFDM) physical layer may be used for millimeter wave communications, such as the systems envisioned in the Institute of Electrical and Electronic Engineers (IEEE) 802.11.ad and IEEE 801.15.3c standards, and the Wireless Gigabit Alliance (WGA). The PHY layer may be configured for millimeter wave communications in the spectrum of 57 to 66 gigahertz (GHz), or Ultra Wide Band (UWB) communications in the spectrum of 3.1 to 10.6 GHz.

To allow interoperability between devices or networks that support either single-carrier or OFDM PHY modes, all devices further support a common mode referred to as a control PHY. Specifically, the common mode is a single-carrier base-rate mode employed by both OFDM and single-carrier devices to facilitate co-existence and interoperability between different devices and different networks. The common mode may be employed for beaconing, control, management, and communicating command and data frames (packets).

In another aspect of the related art, devices typically employ one or more Golay codes to provide spreading of different fields of a packet. Complementary codes, first introduced by Golay in M. Golay, "Complementary Series," IRE Transaction on Information Theory, Vol. 7, Issue 2, April 1961, are sets of complementary pairs of equally long, finite sequences of two kinds of elements. These complementary pairs have the property that the number of pairs of like elements with any given separation in one code is equal to the number of unlike elements with the same separation in the other code. The complementary codes first described by Golay were pairs of binary complementary codes with elements +1 and −1, wherein the sum of their respective aperiodic autocorrelation sequence is zero everywhere, except for the center tap.

In a wireless network, such as a wireless personal are network (WPAN) and wireless local area network (WLAN), equalizing received single-carrier transmissions is one of the most complex tasks that a receiver performs. The equalizer is usually designed for worst case (i.e., longest) delay spread. Thus, even when channel conditions are good, a high-complexity equalizer is used. Therefore, there is a need in the art for a single-carrier modulation scheme that allows a receiver to select one of a low-complexity equalizer and a higher-complexity equalizer depending on the wireless channel conditions.

SUMMARY

Aspects disclosed herein may be advantageous to systems employing millimeter-wave WPANs or WLANs (such as the WLANs described by the IEEE802.11.ad, IEEE 802.11.ac and WGA protocols). However, the disclosure is not intended to be limited to such systems, as other applications may benefit from similar advantages.

According to an aspect of the disclosure, a data portion of a frame is partitioned into blocks, wherein each block comprises a set of sub-blocks. At least one of the sub-blocks comprises a known long sequence (i.e., known to both the transmitter station and the receiver station), and each of the remaining sub-blocks comprise a data portion and a known short sequence, wherein the known short sequence is a copy of the first or last portion of the known long sequence.

According to another aspect of the disclosure, a wireless receiver is configured to receive a frame from a wireless communication channel, estimate a wireless channel impulse response, and, depending on the channel conditions, the receiver may select either a low-complexity equalizer for processing the sub-blocks or a higher-complexity receiver for processing the blocks.

According to another aspect of the disclosure, a receiver is configured to receive a frame from a wireless communication channel, estimate a short channel impulse response, and employ a low-complexity equalizer for processing the sub-blocks. Specifically, the receiver equalizes the data sub-block by sub-block.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5A illustrates a data portion of a frame in accordance with certain aspects of the present disclosure.

FIG. 5B illustrates a data portion of a frame according to certain aspects of the present disclosure.

FIG. 8A is a block diagram of a low-complexity frequency-domain equalizer in accordance with certain aspects of the present disclosure.

FIG. 8B is a block diagram of a higher-complexity frequency-domain equalizer in accordance with certain aspects of the present disclosure.

FIG. 9A is a flow diagram for a method of processing a frame in accordance with certain aspects of the present disclosure.

FIG. 9B is a block diagram of an apparatus configured to perform the method illustrated in FIG. 9A.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope and spirit of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single-carrier transmission and OFDM. Aspects disclosed herein may be advantageous to systems employing Ultra Wide Band (UWB) signals including millimeter-wave signals, Code Division Multiple Access (CDMA) signals, and OFDM. However, the present disclosure is not intended to be limited to such systems, as other coded signals may benefit from similar advantages.

Figure 1:
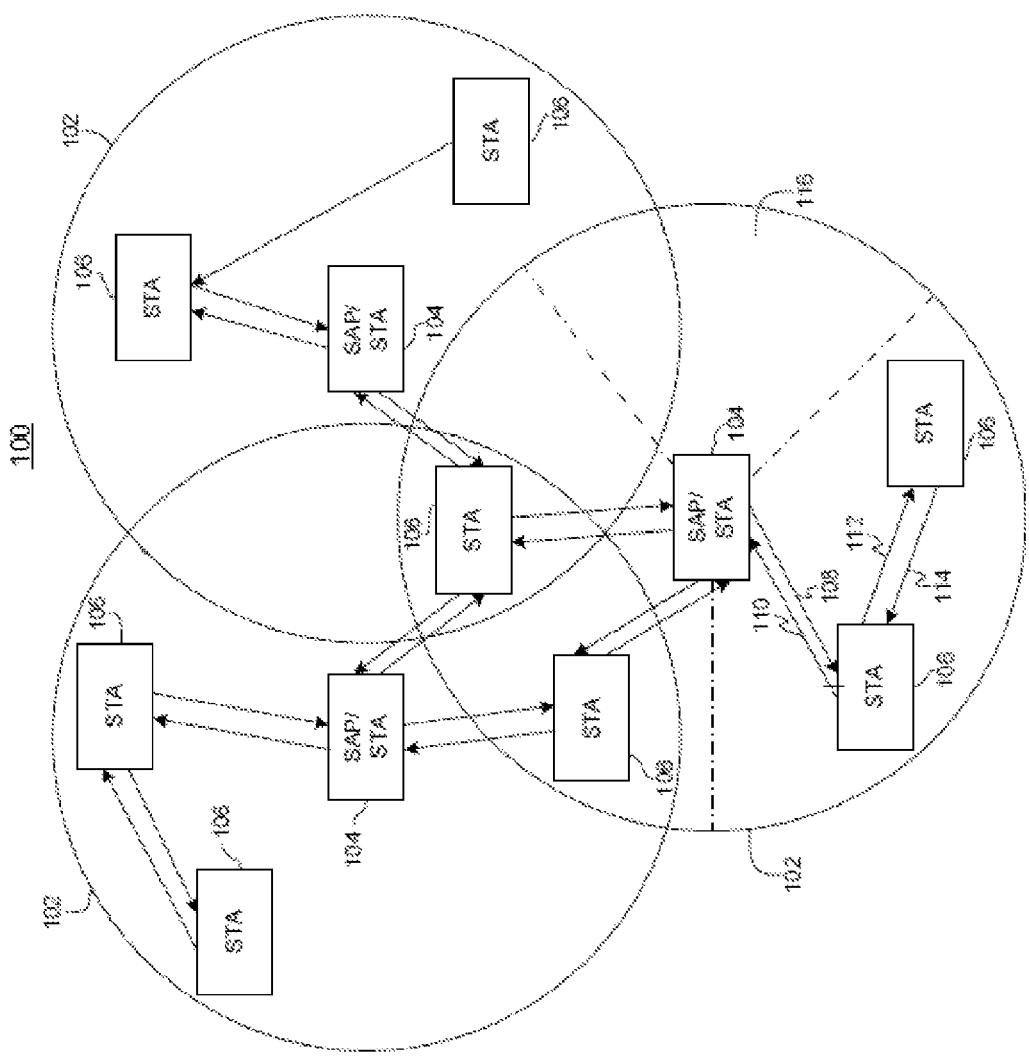
FIG. 1 illustrates an exemplary wireless communication system in accordance with certain aspects of the present disclosure.

FIG. 1 illustrates an exemplary wireless communication system 100 in which aspects of the present disclosure may be employed. The wireless communication system 100 may be a broadband wireless communication system compatible with the IEEE 802.11 and 802.15. The wireless communication system 100 may provide communication for a number of Basic Service Sets (BSSs) 102, each of which may be serviced by a Service Access Point (SAP) 104. A SAP 104 may be a fixed station or a mobile station that communicates with Stations (STAs) 106. A BSS 102 may alternatively be referred to as cell, piconet or some other terminology. The SAP 104 may alternatively be referred to as a base station, a piconet controller, a Node B, a wireless device, a master device, or some other terminology.

FIG. 1 depicts various stations 106 dispersed throughout the system 100. The stations 106 may be fixed (i.e., stationary) or mobile. Each STA of the plurality of STAs 106 implements a MAC and PHY interface to the wireless medium of the network 100. The STAs 106 may alternatively be referred to as remote stations, access terminals, terminals, subscriber units, mobile stations, wireless devices, user equipment, etc. The STAs 106 may be wireless devices, such as cellular phones, personal digital assistants (PDAs), handheld devices, wireless modems, laptop computers, personal computers, etc.

Under IEEE 802.11 and 802.15, one STA assumes the role of a coordinator (master) of the BSS. This coordinating STA is referred to as a Service Access Point (SAP) and is illustrated in FIG. 1 as the SAP 104. Thus, the SAP 104 may include the same station functionality of the plurality of other stations (STAs 106), but provides coordination and management for the network. For example, the SAP 104 provides services, such as basic timing for the network 100 using a beacon; and management of any Quality of Service (QoS) requirements, power-save modes, and network access control. A wireless device with similar functionality as described for the SAP 104 in other systems may be referred to as an piconet controller, a base station, a base transceiver station, a station, a terminal, a node, an access terminal acting as an access point, or some other suitable terminology. The SAP 104 coordinates the communication between the various stations (STAs 106) in the network 100 using a frame structure referred to as a superframe. Each superframe is bounded in time by beacon periods. The SAP 104 may be coupled to a system controller to communicate with other networks or other SAPs.

A variety of algorithms and methods may be used for transmissions in the wireless communication system 100 between the SAPs 104 and the STAs 106 and between STAs 106 themselves. For example, signals may be sent and received between the SAPs 104 and the STAs 106 in accordance with CDMA technique and signals may be sent and received between STAs 106 in according with OFDM technique. If this is the case, the wireless communication system 100 may be referred to as a hybrid CDMA/OFDM system.

A communication link that facilitates transmission from an SAP 104 to an STA 106 may be referred to as a downlink (DL) 108, and a communication link that facilitates transmission from an STA 106 to an SAP 104 may be referred to as an uplink (UL) 110. Alternatively, a downlink 108 may be referred to as a forward link or a forward channel, and an uplink 110 may be referred to as a reverse link or a reverse channel. When two STAs communicate directly with each other, a first STA will act as the master of the link, and the link from the first STA to the second STA will be referred to as the downlink 112, and the link from the second STA to the first STA will be referred to as the uplink 114.

A BSS 102 may be divided into multiple sectors. A sector 116 is a physical coverage area within the BSS 102. SAPs 104 within the wireless communication system 100 may utilize antennas that concentrate the flow of power within a particular sector 116 of the BSS 102. Such antennas may be referred to as directional antennas.

Figure 2:
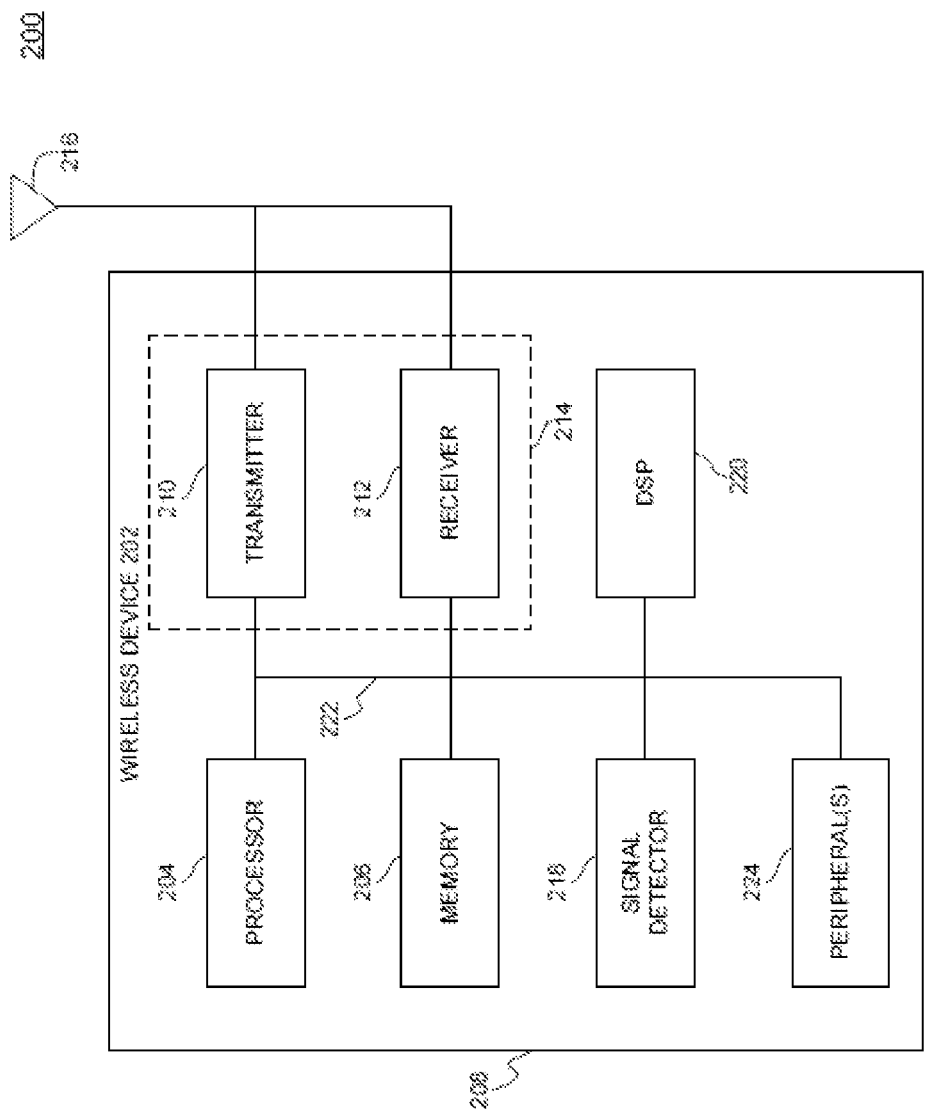
FIG. 2 is a block diagram of a wireless device in accordance with certain aspects of the present disclosure.

FIG. 2 illustrates various components that may be utilized in a wireless device 210 employed within the wireless communication system 100. The wireless device 210 is an example of a device that may be configured to implement the various methods described herein. The wireless device 202 may be an SAP 104 or an STA 106.

The wireless device 202 may include a processor 204 that controls operation of the wireless device 202. The processor 204 may also be referred to as a central processing unit (CPU). Memory 206, which may include one or both readonly memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may include one or more wired peripherals 224 such as USB, HDMI, or PCIE. The wireless device 202 may also include (not shown) multiple transmitters, multiple receivers, multiple transceivers, and/or multiple antennas.

The wireless device 202 may also include a signal detector 218 that may be used to detect and quantify the level of signals received by the transceiver 214. The signal detector 218 may detect such signals as total energy, energy per subcarrier per symbol, power spectral density, and/or other signal measurements that are known in the art. The wireless device 202 may also include a digital signal processor (DSP) 220 for processing signals.

The various components of the wireless device 202 may be coupled together by a bus system 222, which may include a power bus, a control signal bus, and a status signal bus, in addition to a data bus.

Figure 3:
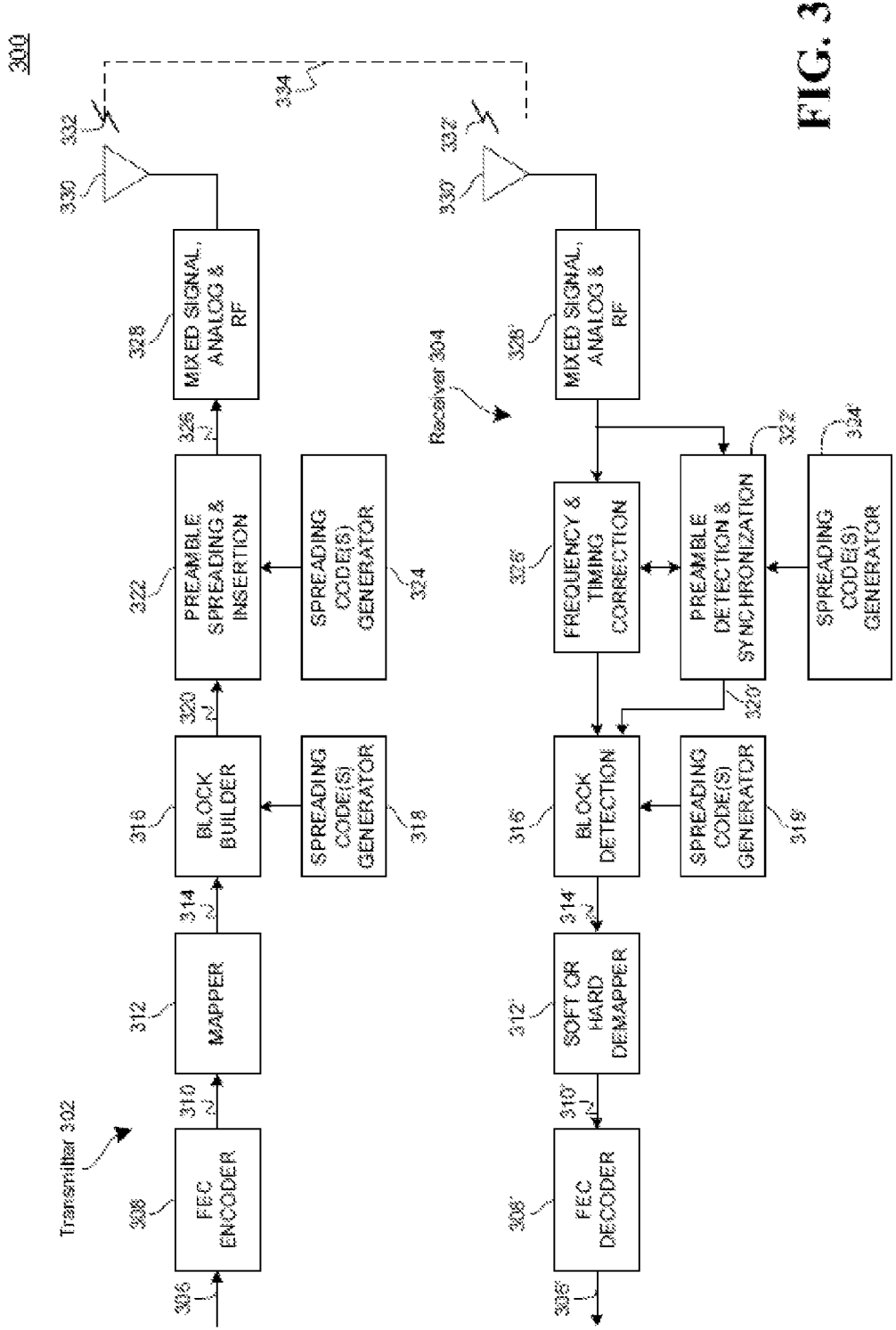
FIG. 3 is a block diagram of an exemplary transceiver that may be used within a wireless communication system in accordance with certain aspects of the present disclosure.

FIG. 3 illustrates an exemplary transmitter 302 that may be used within a wireless communication system 100 that utilizes CDMA or some other transmission technique. Portions of the transmitter 302 may be implemented in the transmitter 210 of a wireless device 202. The transmitter 302 may be implemented in a base station 104 for transmitting data 330 to a user terminal 106 on a downlink 108. The transmitter 302 may also be implemented in a station 106 for transmitting data 330 to a service access point 104 on an uplink 110.

Data 306 to be transmitted are shown being provided as input to a forward error correction (FEC) encoder 308. The FEC encoder 308 encodes the data 306 by adding redundant bits. The FEC encoder 308 may encode the data 306 using a convolutional encoder, a Reed Solomon encoder, a Turbo encoder, a low density parity check (LDPC) encoder, etc. The FEC encoder 308 outputs an encoded data stream 310. The encoded data stream 310 is input to a mapper 314. The mapper 314 may map the encoded data stream onto constellation points. The mapping may be done using some modulation constellation, such as binary phase-shift keying (BPSK), quadrature phase-shift keying (QPSK), 8 phase-shift keying (8PSK), quadrature amplitude modulation (QAM), constant phase modulation (CPM), etc. Thus, the mapper 312 may output a symbol stream 314, which may represents one input into a block builder 310. Another input in the block builder 310 may include one or more spreading codes produced by a spreading code generator 318.

The block builder 310 may be configured for partitioning the symbol stream 314, into sub-blocks and creating OFDM/OFDMA symbols or single-carrier sub-blocks. The block builder 310 may append each sub-block with a guard interval, a cyclic prefix, or a spreading sequence from the spreading codes generator 318. Furthermore, the sub-blocks may be spread by one or multiple spreading codes from the spreading code generator 318.

Output signal 320 may be pre-pended by a preamble 322 generated from one or more spreading sequences from the spreading code generator 324. The output stream 326 may then be converted to analog and up-converted to a desired transmit frequency band by a radio frequency (RF) front end 328, which may include a mixed signal section and an analog section. An antenna 330 transmits the resulting signal 332.

FIG. 3 illustrates an exemplary receiver 304 that may be used within a wireless device 202 that uses CDMA and/or OFDM/OFDMA. Portions of the receiver 304 may be implemented in the receiver 212 of a wireless device 202. The receiver 304 may be implemented in a station 106 for receiving data 306 from a service access point 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be down-converted to a baseband signal by an RF front-end 328' which may include a mixed signal and an analog portion. Preamble detection and synchronization component 322' may be used to establish timing, frequency and channel synchronization using one or multiple correlators that correlate with one or multiple spreading codes generated by a spreading code generator 324'.

The output of the RF front end block 328' is input to the frequency and timing correction component 326' along with the synchronization information from component 322'. The outputs from components 326' and 322' are input to a block detection component 316'. When OFDM/OFDMA is used, the block detection may include cyclic prefix removal and fast Fourier transform (FFT). When single-carrier transmissions are used, the block detection may include de-spreading and equalization.

A de-mapper 312' may perform the inverse of the symbol mapping operation performed by the mapper 312, thereby outputting soft and/or hard decisions 310'. The soft and/or hard decisions 310' are input to the FEC decoder 308', which provides a stream of data estimates 306'. Ideally, this data stream 306' corresponds to the data 306 that was input to the transmitter 302.

The wireless system 100 illustrated in FIG. 1 may be a UWB/millimeter wave system operating in the band including the 57-64 GHz unlicensed band specified by the Federal Communications Commission (FCC).

Figure 4A:
FIG. 4A illustrates a superframe structure in accordance with certain aspects of the present disclosure.

FIG. 4A illustrates a superframe 400 used for SAP timing in the network 100. In general, a superframe is a basic time-division structure containing a beacon period (BP) 410, a contention based period (CBP) 420, and a channel time allocation (CTAP) period 430, also known as service periods (SPs). The superframe is also known as the beacon time (BT) or beacon interval (BI). In the superframe 400, a beacon period (BP) 410 is provided during which an SAP such as the SAP 104 sends beacon frames.

A Contention Based Period (CBP) 420 is used to communicate command, control, management, and data frames either between the SAP 104 and at least one of the plurality of STAs 106 in the network 100, or between any set of STAs 106 in the network 100. The access method for the CBP 420 may be based on a slotted ALOHA or a carrier sense multiple access with collision avoidance (CSMA/CA) protocol.

A Channel Time Allocation Period (CTAP) 430, which is based on a Time Division Multiple Access (TDMA) protocol, is provided by the SAP 104 to allocate time for the plurality of STAs 106 to use the channels in the network 100. Specifically, the CTAP is divided into one or more time periods (of different sizes), referred to as Channel Time Allocations (CTAs). The CTAs, also known as Service Periods (SPs), are typically allocated by the SAP 104 to pairs of stations, one pair of stations to a CTA. Thus, the access mechanism for CTAs is TDMA-based.

Figure 4B:
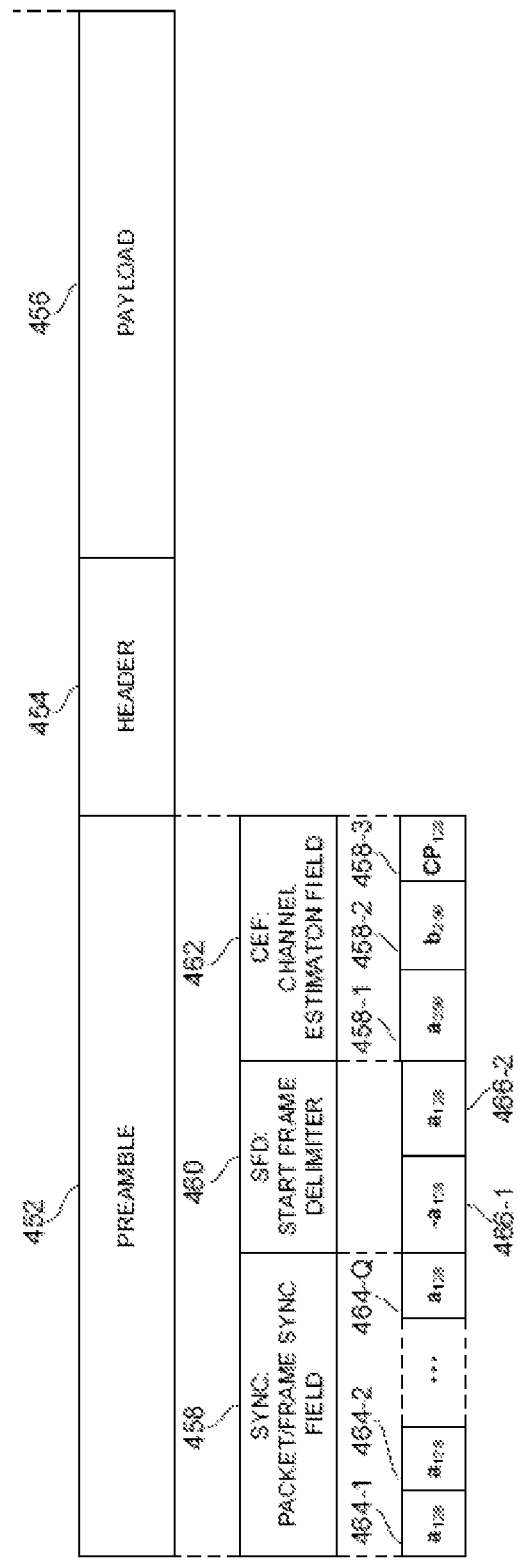
FIG. 4B illustrates a frame structure in accordance with certain aspects of the present disclosure.

FIG. 4B shows an exemplary frame structure 450 that may be used for a single-carrier, OFDM, or common-mode frame. As used herein, the term, frame, may also be used interchangeably with the term, packet. The frame structure 450 includes a preamble 452, a header 454, and a packet payload 456. The common mode may use Golay codes for all three fields, i.e., for the preamble 452, the header 454 and the packet payload 456. The common-mode signal uses Golay spreading codes with chip-level/2-BPSK modulation to spread the data therein. The header 454, which is a physical layer convergence protocol (PLCP) conforming header, and the packet payload 456, which is a physical layer service data unit (PSDU), includes symbols spread with a Golay code of length 32 or 64. Various frame parameters, including, by way of example, but without limitation, the number of Golay-code repetitions and the Golay-code lengths, may be adapted in accordance with various aspects of the frame structure 450. In one aspect, Golay codes employed in the preamble may be selected from length-64 or length-128 Golay codes. Golay codes used for data spreading may comprise length-32 or length-64 Golay codes.

Referring to FIG. 4B, the preamble 452 includes a packet sync sequence field 458, an optional start frame delimiter (SFD) field 460, and a channel-estimation sequence field 462.

The packet sync sequence field 458 is a repetition of ones (or a repetition of minus ones, or an alternating sequence of ones and minus ones) spread by one of the length-128 complementary Golay codes (a128, b128) as represented by codes 464-1 to 464-Q in FIG. 4B. The SFD field 460 comprises a specific code such as {−1, +1} that is spread by one of the length-128 complementary Golay codes (a128, b128), as represented by codes 466-1 and 466-2 in FIG. 4B. The CES field 462 may be spread using a pair of length-256 complementary Golay codes (a256, b256), such as represented by codes 458-1 and 458-2, and may further comprise a cyclic postfix 458-3, which is a length-128 Golay code. The CES field 462 may further comprise a cyclic prefix (not shown), where CP may be used as a Cyclic Prefix or Postfix. A cyclic postfix for code a256 (depicted by 458-1) is shown as CP128 458-3 and is a copy of the first 128 chips of a256 (458-1). The sync field 458 is typically used for AGC (Automatic Gain Control) setting, antenna selection, DC offset removal, packet detection, timing, and frequency and channel acquisition. The SFD field 460 may be used to indicate the end of the sync field 458. The CES field 462 is typically used for multipath channel estimation and fine frequency estimation.

In one aspect of the disclosure, a dual-mode millimeter wave system employing single-carrier modulation and OFDM is provided with a single-carrier common-mode signaling. The common mode, also known as control PHY (Physical layer), is a single-carrier mode used by both single-carrier and OFDM devices for beaconing, signaling (such as control and management), beamforming, and base-rate data communications.

Single-Carrier Block Scheme

In a wireless network, such as wireless personal area network (WPAN) or a wireless local area network (WLAN), it can be advantageous for single-carrier transmissions to structure data into blocks wherein each block is pre-pended or appended with a known sequence that functions as a cyclic prefix or cyclic postfix. Such a structure facilitates frequency-domain equalization, time-domain equalization, as well as hybrid equalization. The block length and the cyclic-prefix length are typically selected for worst case delay spread. Therefore, even under less severe channel conditions, a high-complexity equalizer is used. Therefore, there is a need in the art for a single-carrier block scheme that enables the receiver to equalize the data by selecting either a low-complexity equalizer or a higher-complexity equalizer depending on the wireless channel conditions.

In FIG. 5A, a data portion 510 of a transmission frame comprises a plurality I of equal-length blocks 520-1 to 520-I, wherein the block length K is a power of 2. Specifically, the block length K may be expressed by the equation $K=2^L$, where L is some integer value. The last block 520-I is appended by a known long sequence $G_M$ 530 of length M, which is also a power of 2, and expressed by $M=2^N$ for some integer N. The long sequence is a known sequence for all stations in a BSS. As used herein, a known sequence denotes a sequence that is known at both a first STA transmitting a frame and at a second STA receiving the frame.

According to another aspect of the invention, the known sequence $G_M$ 530 appended to the last block 520-L in FIG. 5A is a Golay sequence of length $M=2^N$.

According to another aspect of the invention, the data portion 510 shown in FIG. 5A includes a header portion 454 and a payload portion 456 of the frame 450 shown in FIG. 4B.

According to another aspect of the invention, each data block of length $K=2^L$ is partitioned into a plurality J equal-length sub-blocks of length $M=2^N$, which is equal to the length of the known long sequence 530 in FIG. 5A. Therefore, block length K is the product of the number of sub-blocks J and the sub-block length M: K=J×M, such as illustrated in FIG. 5B. The data block 552 has a length $K=2^L$ and is partitioned into J equal-length sub-blocks 554-1 to 554-J of length $M=2^N$. In one aspect of the invention, the first sub-block 554-1 is the known long sequence $G_M$ 556 (also depicted as 530 in FIG. 5A). According to another aspect of the invention, each of the remaining sub-blocks 554-2 to 554-J comprises a data portion of length M−R samples appended by a known short sequence $G_R$ of length R. As an example, sub-block 554-2 comprises a data portion $D_{1, M-R}$ 558-1 having length M−R samples and a known short sequence $G_R$ 560-1. Sub-block 554-3 comprises a second data portion $D_{2, M-R}$ 558-2 of length M−R samples and a known short sequence $G_R$ 560-2.

The last sub-block 554-(J−1) comprises a (J−1)$^{th}$ data portion D$_{J-1, M-R}$ 558-(J−1) having length M−R samples and a known short sequence G$_R$ 560-(J−1).

According to another aspect of the invention, the known short sequence G$_R$ is a copy of the last R samples of the known long sequence G$_M$.

According to another aspect of the invention, the short sequence length R is a power of 2, that is, R=2$^S$ for an integer S.

According to another aspect of the invention, the long Golay sequence G$_M$ at the beginning of a block (such as block 520-A in FIG. 5A) functions as a cyclic postfix for a previously transmitted block (such as block 520-(A−1)). Similarly, sequence G$_M$ at the beginning of block 520-(A+1) acts as a cyclic postfix for block 520-A. The last sequence G$_M$ in 530 acts as a cyclic postfix for block 520-I.

It is well known that a cyclic postfix (or prefix) transforms a linear convolution into a circular convolution. Therefore, when a receiver processes each block 520-1 to 520-I, the received signal may be modeled on a block-by-block basis as a circular convolution between the content of the block and the linear multipath channel impulse response (CIR), assuming that the CIR length is mostly concentrated within M samples, where M is the length of the known sequence G$_M$. A simplified model for the received signal corresponding to a data block is as follows:

$$x(k) = h(k) \otimes d(k) + w(k), k=0: K-1,$$

where x(k) is the k$^{th}$ received sample, h(k) is the k$^{th}$ tap of the CIR, d(k) is the k$^{th}$ sample of the data block, w(k) is the additive white Gaussian noise, and $\otimes$ represents the circular convolution operator.

Different equalization methods may be used, such as frequency-domain equalization, time-domain equalization or hybrid frequency and time equalization. FIG. 8A illustrates a block frequency-domain equalizer according to one aspect of the invention. An input data block 802 (such as x(k) for k=0:K−1) is input to an FFT module 804 which performs a Fast Fourier Transform over length K=2$^L$. The output frequency-domain block 806 may be represented as follows:

$$X(k) = H(k) \otimes D(k) + W(k), k=0: K-1,$$

where X, H, D and W are the FFTs of x, h, d, and w respectively over K samples.

The frequency-domain block, X, is input to a single tap minimum mean square equalizer 808, and the frequency-domain equalized output 810 may be written as follows:

$$\hat{D}(k) = H^*(k) \times X(k) / [|H(k)|^2 + B], k=0: K-1,$$

where $\hat{D}$ is an estimate of the frequency domain data block (that is an estimate of the FFT of the data block d(k) for k=0: K−1), H*(k)/[|H(k)|²+B] is the frequency-domain minimum mean square equalizer (MMSE) applied to the received signal X(k), and B is a parameter that depends on the signal to noise ratio (SNR).

Finally, at step 814, an estimate, $\hat{d}(k)$ for k=0: K−1, is obtained by computing the IFFT (Inverse FFT) in 812 of input $\hat{D}(k)$ for k=0: K−1.

According to another aspect of the invention, the short sequence G$_R$ in a sub-block functions as a cyclic postfix for the following sub-block. In FIG. 5B, the short sequence G$_R$ in 560-1 of sub-block 554-2 functions as a cyclic prefix of sub-block 554-3 (i.e., G$_R$ is a copy of the last R samples of sub-block 554-3). The last R samples of the long sequence 556 act as a cyclic prefix for sub-block 554-2. Consequently, each of the data sub-blocks 554-2 to 554-J has a cyclic prefix. Thus, if most of the energy of the multipath channel impulse response (CIR) is in the first R samples (referred to as the short CIR), then a received sub-block corresponding to a sub-block of the transmitted frame may be modeled as a cyclic convolution between the sub-block and the short CIR, which allows for equalization to be performed sub-block by sub-block in a manner similar to that performed by the block-by-block equalizer described above. The main difference between the block-by-block equalizer and the sub-block by sub-block equalizer is that the sub-block by sub-block equalizer operates on only M samples at a time, whereas the block-by-block equalizer operates on K=M×J samples. FIG. 8B illustrates a short MMSE frequency-domain equalizer that is similar to the long MMSE frequency-domain equalizer shown in FIG. 8A.

Figures 7A, 7B:
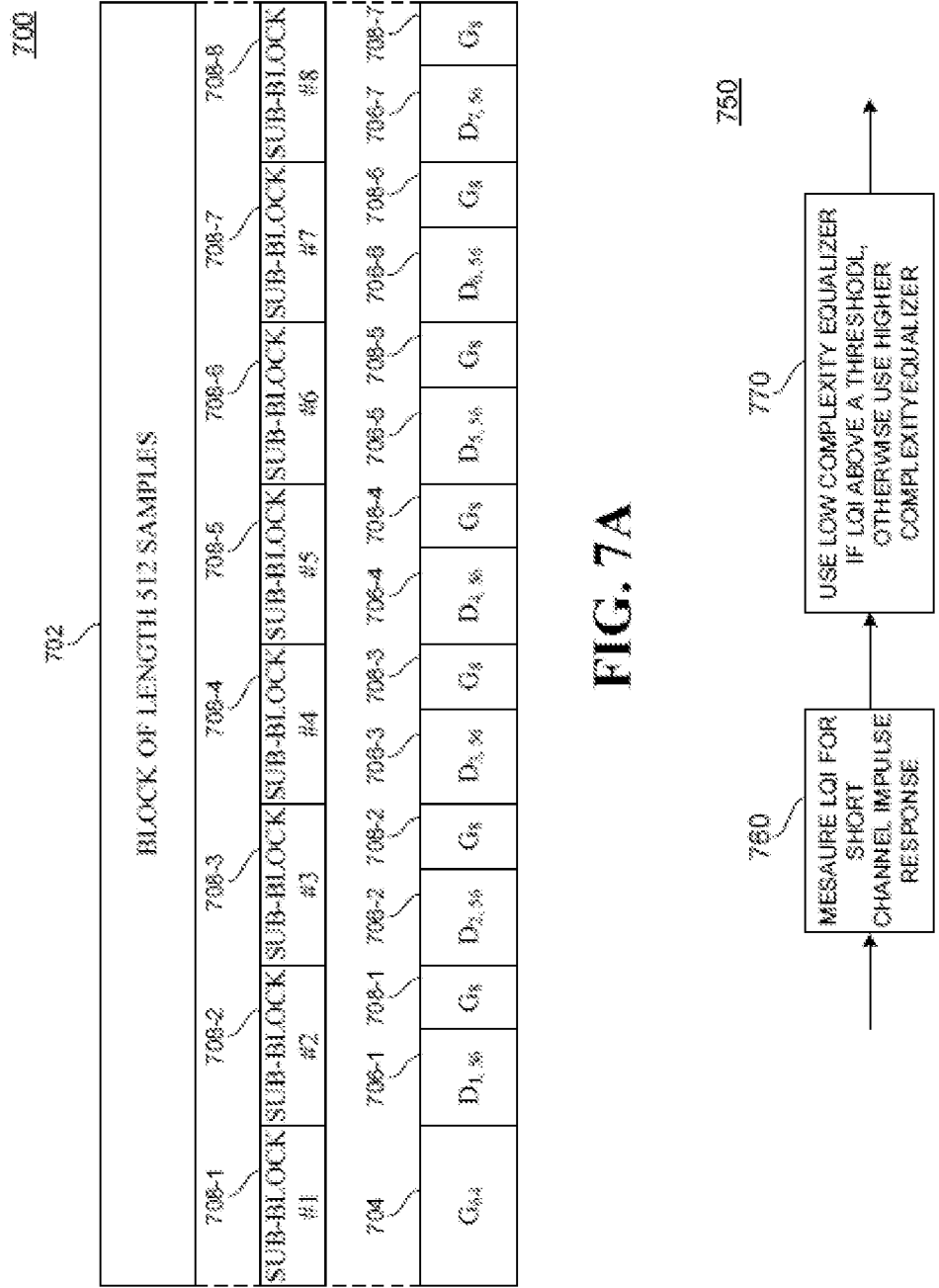
FIG. 7A illustrates an exemplary partitioning of a block of 512 samples into eight sub-blocks of length 64 samples each in accordance with certain aspects of the present disclosure.
FIG. 7B is a flow diagram showing a method for estimating a channel impulse response and selecting an equalizer in accordance with certain aspects of the present disclosure.

FIG. 7B is a block diagram of a receiver STA according to one aspect of the invention. A Link Quality indicator (LQI) module 760 estimates a long CIR over M samples and estimates a short CIR over R samples. LQI module 760 computes an LQI associated with the short CIR (which is referred to herein as a short LQI). An equalizer-selection module 770 selects between at least two equalizers characterized by different levels of complexity. For example, if the short LQI is above a predetermined threshold, the module 770 may select a low complexity equalizer. For example, module 770 may select a sub-block by sub-block equalizer, such as the short MMSE frequency-domain equalizer shown in FIG. 8B. Alternatively, the module 770 selects a higher-complexity equalizer (e.g., a block-by-block equalizer), such as the long MMSE frequency-domain equalizer shown in FIG. 8A.

In one aspect of the disclosure, the LQI is a metric of the quality of the received signal. Examples of LQI include, but are not limited to, RSSI (Received Signal Strength Indicator), SNR (Signal to Noise Ratio), SNIR (Signal to Noise and Interference Ratio), and SIR (Signal to Interference Ratio).

According to one aspect of the invention, the LQI module 760 computes the long CIR over M samples using at least one of a sync filed 458 and a channel-estimation field 462 of the preamble 452 using a Golay matched filter. According to another aspect of the invention, a sliding window over R samples is used to estimate the short CIR of length R from the long CIR of length M. To illustrate this concept, let the long CIR be denoted h(n) for n=0: M−1. To estimate the short CIR using a sliding window, the following short CIR energy candidates are computed:

$$E(t) = \Sigma_{r=t}^{t+R-1} |h(r)|^2 \text{ for } t=0: M-R$$

If E(t$_{max}$)=max[E(0), E(1), . . . , E(M−R)], then according to one aspect of the invention, the short CIR is chosen to be g(n) for n=0: R−1, where $$g(n) = h(n+t_{max}) \text{ for } n=0: R-1.$$

Figure 6A:
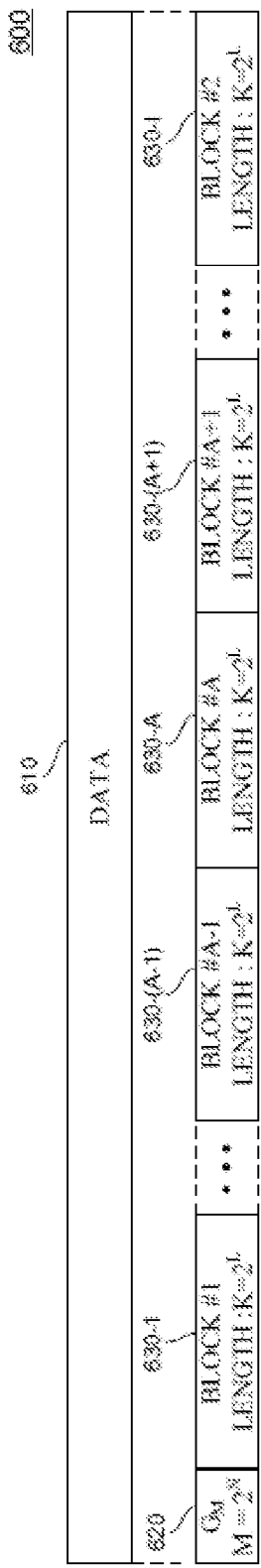
FIG. 6A illustrates a data portion of a frame in accordance with certain aspects of the present disclosure.

FIG. 6A illustrates an alternative data partitioning format according to another aspect of the invention. The data portion of the frame 610 is partitioned into a plurality I of equal-size data blocks 630-1 to 630-I, each having length K=2$^L$, and wherein the first data block 630-1 is prepended by a known long sequence G$_M$ of length M=2$^N$.

Figure 6B:
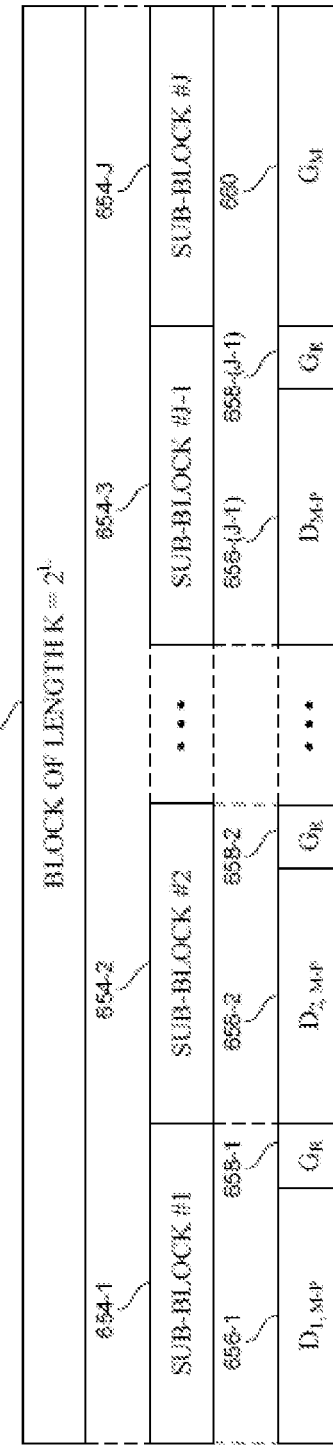
FIG. 6B illustrates a data portion of a frame according to certain aspects of the present disclosure.

Each block comprises a known Golay sequence G$_M$ at the end of the block, as shown in FIG. 6B. According to another aspect of the invention, Golay sequence G$_M$ in a block (e.g., block 630-A) acts as a cyclic prefix for the following block (e.g., block 630-(A+1)). The sequence G$_M$ at the end of block 630-(A−1) acts as a cyclic postfix for block 630-A. The first long sequence G$_M$ 620 acts as a cyclic prefix for block 630-I.

According to another aspect of the invention, the data portion 610 may be equalized at a receiver on a block-byblock basis using, for example, the frequency-domain equalizer shown in FIG. 8A and described above.

According to another aspect of the invention, the short sequence $G_R$ in a sub-block, may be used as a cyclic prefix for the following sub-block. Short sequence $G_R$ in 658-1 in sub-block 654-1 may be used as a cyclic prefix of sub-block 654-2. Specifically, $G_R$ is a copy of the last R samples of sub-block 654-2. The last R samples of long sequence $G_M$ of a previous block (not shown) act as a cyclic prefix of sub-block 654-1. Consequently, each of the data sub-blocks 654-1 to 654-(J−1) has a cyclic prefix. Thus, if most of the energy of the multipath channel impulse response (CIR) occurs within R samples (referred to as a short CIR), then a received sub-block corresponding to a sub-block of the transmitted frame may be modeled as a cyclic convolution between the sub-block of the transmitted frame and the short CIR, which allows for equalization to be performed sub-block by sub-block in a manner similar to the block-by-block equalizer described above. The main difference between the block-by-block equalizer and the sub-block by sub-block equalizer is that the sub-block by sub-block equalizer employs only M samples, whereas the block-by-block equalizer employs K=M×J samples.

FIG. 7A illustrates an exemplary format for a data block 702 according to one aspect of the invention. The data block 702 comprises K=512 samples, and there are J=8 sub-blocks 708-1 to 708-8 of length-64 (i.e., 64 samples). Each sub-block 708-1 to 708-8 contains a data portion of 56 samples and a known short sequence $G_8$ of length 8. The first sub-block 708-1 comprises a known Golay sequence $G_8$ 704 of length 64. The sub-blocks 708-2 to 708-8 comprise data portions 706-1 to 706-7 and a copy of the short sequence $G_8$ 708-1 to 708-7 respectively. In addition, the known short sequence $G_8$ comprises the last 8 samples of the long Golay sequence $G_{64}$. Furthermore, when the channel conditions are favorable (i.e., when the short CIR has a good enough LQI), low-complexity sub-block equalization is selected for processing 64 samples at a time. Otherwise, higher-complexity block equalization employing 512 samples is used. Low-complexity sub-block equalization reduces both peak and average power as compared to block equalization. As an example, using a frequency domain sub-block equalizer, such as the equalizer shown in FIG. 8B, the peak power may be reduced by almost a factor of 8 when compared to the frequency-domain block equalizer shown in FIG. 8A.

Finally, a station designed to operate at a short range may use the sub-block equalizer all the time because the delay spread is small at short range, and the short CIR typically has a high LQI.

According to another aspect of the invention, data portions inside the sub-blocks may be spread, scrambled, FEC (Forward error correction) encoded, and/or modulated (using at least one of Binary Phase Shift Keying, Quadrature Phase shift Keying, Quadrature Amplitude Modulation, Gaussian Frequency Shift Keying, rotated BPSK, rotated QPSK, and rotated QAM).

FIG. 9A is a flow diagram for a method of processing a data frame for transmission. An initial data frame is acquired 902. The data frame is formatted 904, wherein the data portion of the frame comprises a header and a payload that is partitioned into equal-size blocks. Each block comprises a set of equal-size sub-blocks. The first sub-block contains a known sequence (such as a Golay sequence). The other sub-blocks each comprise a data portion and a known short sequence obtained from the end of the known long sequence, and the last block is appended with the known long sequence. After formatting, the frame is transmitted 906. FIG. 9B is a block diagram of an apparatus configured to perform the method shown in FIG. 9A.

Figure 10A:
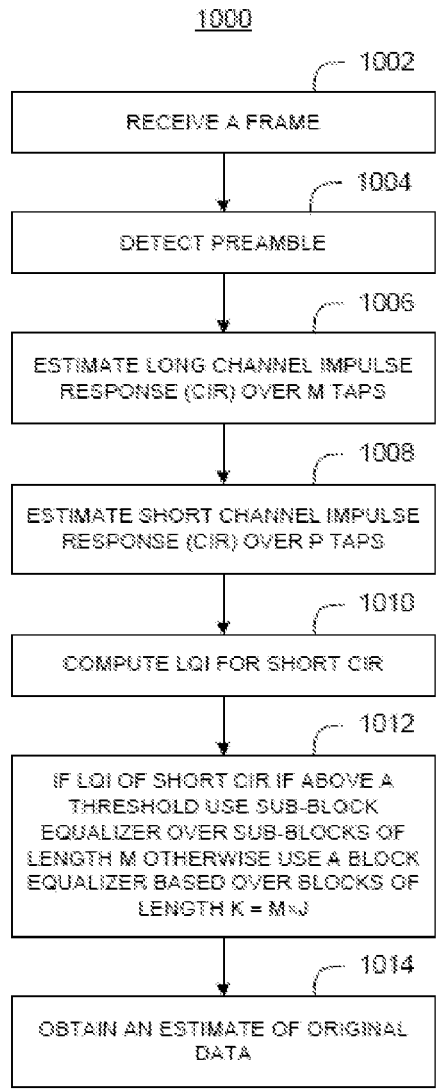
FIG. 10A is a flow diagram for a method of processing a frame in accordance with certain aspects of the present disclosure.
Figure 10B:
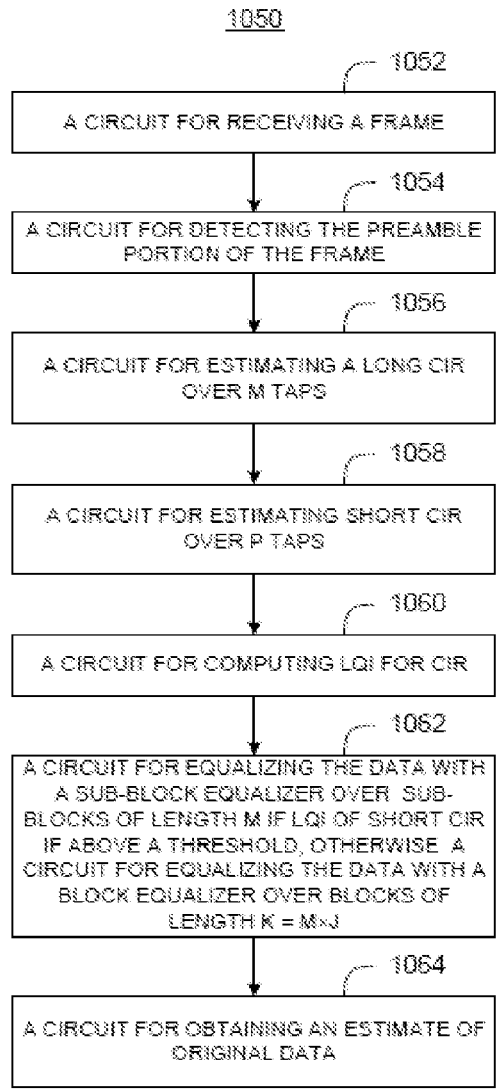
FIG. 10B is a block diagram of an apparatus configured to perform the method illustrated in FIG. 10A.

FIG. 10A is a flow diagram of a method 1000 for processing a received data frame according to an aspect of the invention. The receiving method 1000 provides for receiving a frame 1002, detecting a preamble 1004, estimating a long channel impulse response (CIR) 1006, estimating a short CIR 1008, computing an LQI for a short CIR 1010, selecting sub-block or block equalization 1012, and estimating received data symbols. The equalization step 1012 comprises performing sub-block equalization if the LQI is above a given threshold, or block-by-block equalization if the LQI is below a given threshold. FIG. 10B is a block diagram of an apparatus configured to perform the method shown in FIG. 10A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, blocks 902-906, and 1002-1014, illustrated in FIGS. 9A, and 10A correspond to circuit blocks 952-956 and 1052-1064 illustrated in FIGS. 9B and 10B.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CDROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in a base station, a mobile handset, a personal digital assistant (PDA) or other type of wireless device that operate in UWB part of spectrum with processing logic and elements to perform the techniques provided herein.

The invention claimed is:

1. A method operating on at least a wireless transmitter, the method comprising:
    partitioning a data frame into a plurality of blocks;
    partitioning each of the plurality of blocks into a plurality of sub-blocks;
    inserting at least one of a first set of cyclic prefixes and a first set of cyclic postfixes into the blocks to allow a linear convolution of a frequency-selective multipath channel having a long delay spread to be modeled as a circular convolution at a wireless receiver; and
    inserting at least one of a second set of cyclic prefixes and a second set of cyclic postfixes into the sub-blocks to allow a linear convolution of a frequency-selective multipath channel having a short delay spread to be modeled as a circular convolution at the wireless receiver.

2. The method recited in claim 1, wherein the plurality of blocks comprises a plurality of equal-length data blocks, and each of the plurality of sub-blocks has a length equal to a known long-sequence length; wherein inserting at least one of a first set of cyclic prefixes and a first set of cyclic postfixes comprises appending or pre-pending the known long sequence to the plurality of equal-length blocks, and selecting the known long sequence as a first one or a last one of the plurality of sub-blocks; and wherein inserting at least one of a second set of cyclic prefixes and a second set of cyclic postfixes comprises, partitioning all but the first one of the plurality of sub-blocks into a data portion appended by a known short sequence.

3. The method recited in claim 2, wherein the long-sequence length is a power of two.

4. The method recited in claim 2, wherein the long sequence is a Golay sequence.

5. The method recited in claim 2, wherein the known short sequence is a copy of a portion of the known long sequence.

6. The method recited in claim 2, wherein the short sequence length is a power of two.

7. The method recited in claim 1, wherein each of the plurality of blocks has a block length that is a power of two.

8. A computer program residing on a non-transitory computer-readable memory configured to perform the method recited in claim 1.

9. A digital computer system programmed to perform the method recited in claim 1.

10. In a wireless communication system, an apparatus comprising:
    a memory storage device adapted to store computer readable instructions for formatting a data frame for transmission; and
    a processing unit coupled to the memory storage device, adapted to:
        partition the data frame into a plurality of blocks;
        partition each of the plurality of blocks into a plurality of sub-blocks;
        insert at least one of a first set of cyclic prefixes and a first set of cyclic postfixes into the blocks to allow a linear convolution of a frequency-selective multipath channel having a long delay spread to be modeled as a circular convolution at a wireless receiver; and insert at least one of a second set of cyclic prefixes and a second set of cyclic postfixes into the sub-blocks to allow a linear convolution of a frequency-selective multipath channel having a short delay spread to be modeled as a circular convolution at the wireless receiver.

11. The apparatus recited in claim 10, wherein the plurality of blocks comprises a plurality of equal-length data blocks, and each of the plurality of sub-blocks has a length equal to a known long-sequence length; wherein the at least one of a first set of cyclic prefixes and a first set of cyclic postfixes comprises the known long sequence appended or pre-pended to the plurality of equal-length blocks, and the known long sequence employed as a first one or a last one of the plurality of sub-blocks; and wherein the at least one of a second set of cyclic prefixes and a second set of cyclic postfixes comprises a known short sequence appended to a data portion in all but the first one of the plurality of sub-blocks.

12. The apparatus recited in claim 11, wherein the long-sequence length is a power of two.

13. The apparatus recited in claim 11, wherein the long sequence is a Golay sequence.

14. The apparatus recited in claim 11, wherein the known short sequence is a copy of a portion of the known long sequence.

15. The apparatus recited in claim 11, wherein the short sequence length is a power of two.

16. The apparatus recited in claim 11, wherein each of the plurality of blocks has a block length that is a power of two.

17. A wireless transmitter, comprising:

means for partitioning a data frame into a plurality of blocks;

means for partitioning each of the plurality of blocks into a plurality of sub-blocks;

means for inserting at least one of a first set of cyclic prefixes and a first set of cyclic postfixes into the blocks to allow a linear convolution of a frequency-selective multipath channel having a long delay spread to be modeled as a circular convolution at a wireless receiver; and means for inserting at least one of a second set of cyclic prefixes and a second set of cyclic postfixes into the sub-blocks to allow a linear convolution of a frequency-selective multipath channel having a short delay spread to be modeled as a circular convolution at the wireless receiver.

* * * * *